(12) United States Patent
Baranek et al.

(10) Patent No.: US 12,027,056 B2
(45) Date of Patent: Jul. 2, 2024

(54) SYSTEMS AND METHODS USING IMAGE PROCESSING TO DETERMINE AT LEAST ONE KINEMATIC STATE OF A VEHICLE

(71) Applicant: Honeywell Aerospace SAS, Toulouse (FR)

(72) Inventors: Radek Baranek, Litovel (CZ); Zdenek Kana, Dubnany (CZ); Milos Sotak, Košice-Šaca (SK); Michal Dobes, Olomouc (CZ); Vibhor L Bageshwar, Rosemount, MN (US)

(73) Assignee: Honeywell Aerospace SAS, Toulouse (FR)

( * ) Notice: Subject to any disclaimer, the term of this patent is extended or adjusted under 35 U.S.C. 154(b) by 421 days.

(21) Appl. No.: 16/999,490

(22) Filed: Aug. 21, 2020

(65) Prior Publication Data

US 2022/0058966 A1 Feb. 24, 2022

(51) Int. Cl.

| | | |
|---|---|---|
| *G01C 21/00* | (2006.01) | |
| *B64D 43/00* | (2006.01) | |
| *G01C 21/16* | (2006.01) | |
| *G06F 17/16* | (2006.01) | |
| *G06F 17/18* | (2006.01) | |
| *G06N 7/00* | (2023.01) | |
| *G06V 20/13* | (2022.01) | |

(Continued)

(52) U.S. Cl.
CPC .......... *G08G 5/0073* (2013.01); *B64D 43/00* (2013.01); *G06F 17/16* (2013.01); *G06F 17/18* (2013.01); *G06V 20/13* (2022.01); *G08G 5/0052* (2013.01); *G05D 1/0055* (2013.01)

(58) Field of Classification Search
None
See application file for complete search history.

(56) References Cited

U.S. PATENT DOCUMENTS

| | | |
|---|---|---|
| 6,157,876 A | 12/2000 | Tarleton, Jr. et al. |
| 7,089,092 B1 | 8/2006 | Wood et al. |

(Continued)

FOREIGN PATENT DOCUMENTS

| | | |
|---|---|---|
| DE | 10305993 A1 | 8/2004 |
| EP | 2600330 A1 | 6/2013 |
| EP | 2711799 A1 | 3/2014 |

OTHER PUBLICATIONS

European Patent Office, "Extended European Search Report from EP Application No. 21182188.9", from Foreign Counterpart to U.S. Appl. No. 16/999,490, dated Dec. 22, 2021, pp. 1 through 7, Published: EP.

(Continued)

*Primary Examiner* — Adam D Tissot
*Assistant Examiner* — Michael T Silva
(74) *Attorney, Agent, or Firm* — Fogg & Powers LLC

(57) ABSTRACT

System and methods are described that illustrate how to more accurately determine at least one state variable of a vehicle using imaging of a travel way line. Imaging can be used to determine an angle between a longitudinal axis of the travel way line and a longitudinal axis of the vehicle, a shortest distance between the center axis and a reference point on or in the vehicle, and corresponding errors. The determined angle, the determined distance, and the corresponding errors can be used to more accurately determine the at least one state variable.

20 Claims, 5 Drawing Sheets

(51) Int. Cl.
*G08G 5/00* (2006.01)
*G05D 1/00* (2006.01)

(56) References Cited

U.S. PATENT DOCUMENTS

| | | | | |
|---|---|---|---|---|
| 8,560,149 | B1* | 10/2013 | Ganguli | G05D 1/0083 |
| | | | | 701/15 |
| 8,880,328 | B2 | 11/2014 | Ovens et al. | |
| 9,245,450 | B1 | 1/2016 | Chiew et al. | |
| 9,766,074 | B2 | 9/2017 | Roumeliotis et al. | |
| 2003/0223615 | A1 | 12/2003 | Keaton et al. | |
| 2008/0177427 | A1* | 7/2008 | Marty | G08G 5/065 |
| | | | | 701/3 |
| 2009/0212992 | A1 | 8/2009 | Fouet | |
| 2010/0100321 | A1 | 4/2010 | Koenig et al. | |
| 2011/0257873 | A1 | 10/2011 | Lussiez et al. | |
| 2011/0282580 | A1 | 11/2011 | Mohan | |
| 2015/0142220 | A1 | 5/2015 | Scacchi | |
| 2015/0279017 | A1 | 10/2015 | Tamura et al. | |
| 2016/0154110 | A1* | 6/2016 | Destelle | G01S 19/20 |
| | | | | 342/357.58 |
| 2018/0023953 | A1* | 1/2018 | Roumeliotis | G01C 21/165 |
| | | | | 382/190 |
| 2018/0129887 | A1 | 5/2018 | Kang et al. | |
| 2018/0283871 | A1* | 10/2018 | Kana | G06N 7/01 |
| 2019/0263421 | A1* | 8/2019 | Zdych | B60W 40/109 |
| 2020/0202733 | A1* | 6/2020 | Staudinger | G06N 3/08 |
| 2020/0216076 | A1* | 7/2020 | Otto | B60W 40/072 |
| 2022/0058969 | A1 | 2/2022 | Dobes et al. | |

OTHER PUBLICATIONS

European Patent Office, "Extended European Search Report from EP Application No. 21189984.4", dated Jan. 18, 2022, from Foreign Counterpart to U.S. Appl. No. 16/999,490, pp. 1 through 13, Published: EP.

Lu et al, "Improved Situation Awareness for Autonomous Taxiing Through Self-Learning", IEEE Transactions on Intelligent Transportation Systems, IEEE, Piscataway, NJ, USA, vol. 17, No. 12, Jan. 12, 2016, pp. 3553 through 3564, (c) 2016 IEEE.

Mavrantza et al., "Implementation and Evaluation of Spatial Filtering and Edge Detection Techniques for Lineament Mapping—Case Study: Alevrada, Central Greece", Proceedings of SPIE, vol. 4886, Sep. 23, 2002, pp. 417 through 428, http://www.survey.ntua.gr.

Muad et al., "Implementation of Inverse Perspective Mapping Algorithm for the Development of an Automatic Lane Tracking System", TENCON 2004, 2004, IEEE Region 10 Conference Chiang Mai, Thailand, Nov. 21-24, 2004, Piscataway, NJ, USA, IEEE, vol. A, Nov. 21, 2004, pp. 207 through 210.

Arras, "An Introduction to Error Propagation: Derivation, Meaning and Examples of Equation Cy + FxCxFxt", Technical Report No. EPFL-ASL-TR-98-01 R3 of the Autonomous Systems Lab, Institute of Robotic Systems, Sep. 1998, pp. 1 through 22, Swiss Federal Institute of Technology Lausanne (EPFL).

Burgard et al., "Introduction to Mobile Robotics Error Propagation", Uni Freiburg, Jun. 2010, pp. 1 through 14.

Doehler et al., "Robust Position Estimation Using Images from An Uncalibrated Camera", 2003, pp. 1 through 7, IEEE.

Groves, "Principles of GNSS, Inertial, and Multisensor Integrated Navigation Systems", Chapter 12, 2008, pp. 363 through 395, Paul D. Groves.

Sasa et al., "Position and Attitude Estimation Using Image Processing of Runway", 38the Aerospace Sciences Meeting & Exhibit, AIAA-2000-0301, Jan. 2000, pp. 1 through 11, American Institute of Aeronautics & Astronautics.

Wikipedia, "Distance from a point to a line", May 20, 2020, pp. 1 through 5, Wikipedia.

Wikipedia, "Kalman filter", The Free Encyclopedia, Feb. 24, 2020, pp. 1 through 35, accessed Feb. 27, 2020, Wikipedia.

U.S. Patent and Trademark Office, "Office Action", U.S. Appl. No. 16/999,546, dated Jun. 15, 2022, pp. 1 through 24, Published: US.

Kelly, "Introduction to Mobile Robots, Uncertainty 2: Combining Uncertainty", Fall 1996, pp. 1 through 22, accessed Dec. 7, 2022.

U.S. Patent and Trademark Office, "Final Office Action", U.S. Appl. No. 16/999,546, dated Dec. 14, 2022, pp. 1 through 15, Published: US.

U.S. Patent and Trademark Office, "Office Action", U.S. Appl. No. 16/999,546, dated Jun. 1, 2023, pp. 1 through 17, Published: US.

Wikipedia, "Propagation of Uncertainty", Accessed May 26, 2023, pp. 1 through 8.

Wikipedia, "Variance", Accessed May 26, 2023, pp. 1 through 22.

U.S. Patent and Trademark Office, "Advisory Action", U.S. Appl. No. 16/999,546, dated Feb. 22, 2023, pp. 1 through 4, Published: US.

U.S. Patent and Trademark Office, "Notice of Allowance", U.S. Appl. No. 16/999,546, dated Oct. 4, 2023, pp. 1 through 18, Published: US.

* cited by examiner

SYSTEMS AND METHODS USING IMAGE PROCESSING TO DETERMINE AT LEAST ONE KINEMATIC STATE OF A VEHICLE

STATEMENT REGARDING FEDERALLY SPONSORED RESEARCH OR DEVELOPMENT

The project leading to this application has received funding from the SESAR Joint Undertaking under grant agreement No 734153 under European Union's Horizon 2020 research and innovation programme.

BACKGROUND

Aircraft depart and arrive at airports. The aircraft travel on taxiways when travelling between an airport terminal and runway. Structure(s) may be near the taxiway. Other vehicle(s) may be on or near the taxiway. To avoid damage to the aircraft and injury to the aircraft's crew, passengers, and/or cargo, the aircraft must avoid impacting such structure(s) and/or other vehicle(s). To do so, onboard navigation systems estimate the statistics of the aircraft's vehicle kinematic states (such as the aircraft's position, three dimensional angular orientation, and, possibly, velocity) and provide these statistics to the aircraft crew and/or aircraft control system(s). The aircraft crew and/or aircraft control system(s) are then responsible for ensuring the aircraft avoids collisions with the airport infrastructure or other vehicles. Conventionally, the aircraft's kinematic states are estimated using a global navigation satellite system (GNSS) receiver and/or an inertial navigation system (INS). However, a GNSS receiver, an INS, or a combination thereof have navigation performance that may not satisfy navigation requirements to enable an aircraft crew and/or an aircraft control system(s) to avoid a collision.

SUMMARY

The following summary is made by way of example and not by way of limitation. A method of determining at least one state variable of a vehicle by a travel way is provided. The method comprises: initializing a statistical estimator with an initial state mean vector and an initial state covariance matrix; receiving inertial navigation data; predicting, for a future time epoch, a state mean vector and a state covariance matrix for a state vector of the statistical estimator using the inertial navigation data; receiving an image; determining measurement statistics for (a) an angle between a longitudinal axis of the vehicle and a longitudinal axis of a travel way line, and (b) a shortest distance between a reference point on or in the vehicle and the longitudinal axis of the travel way line; determining whether any of the measurement statistics are erroneous; upon determining that none of the measurement statistics are erroneous, then updating predicted statistics of the state vector using the determined measurement statistics of the angle and the shortest distance, wherein the state vector comprises at least one vehicle kinematic state; and providing at least one vehicle kinematic state to at least one of a flight crew and a vehicle system.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the subject matter described. Reference characters denote like elements throughout Figures and text.

DETAILED DESCRIPTION

Figure 1A:
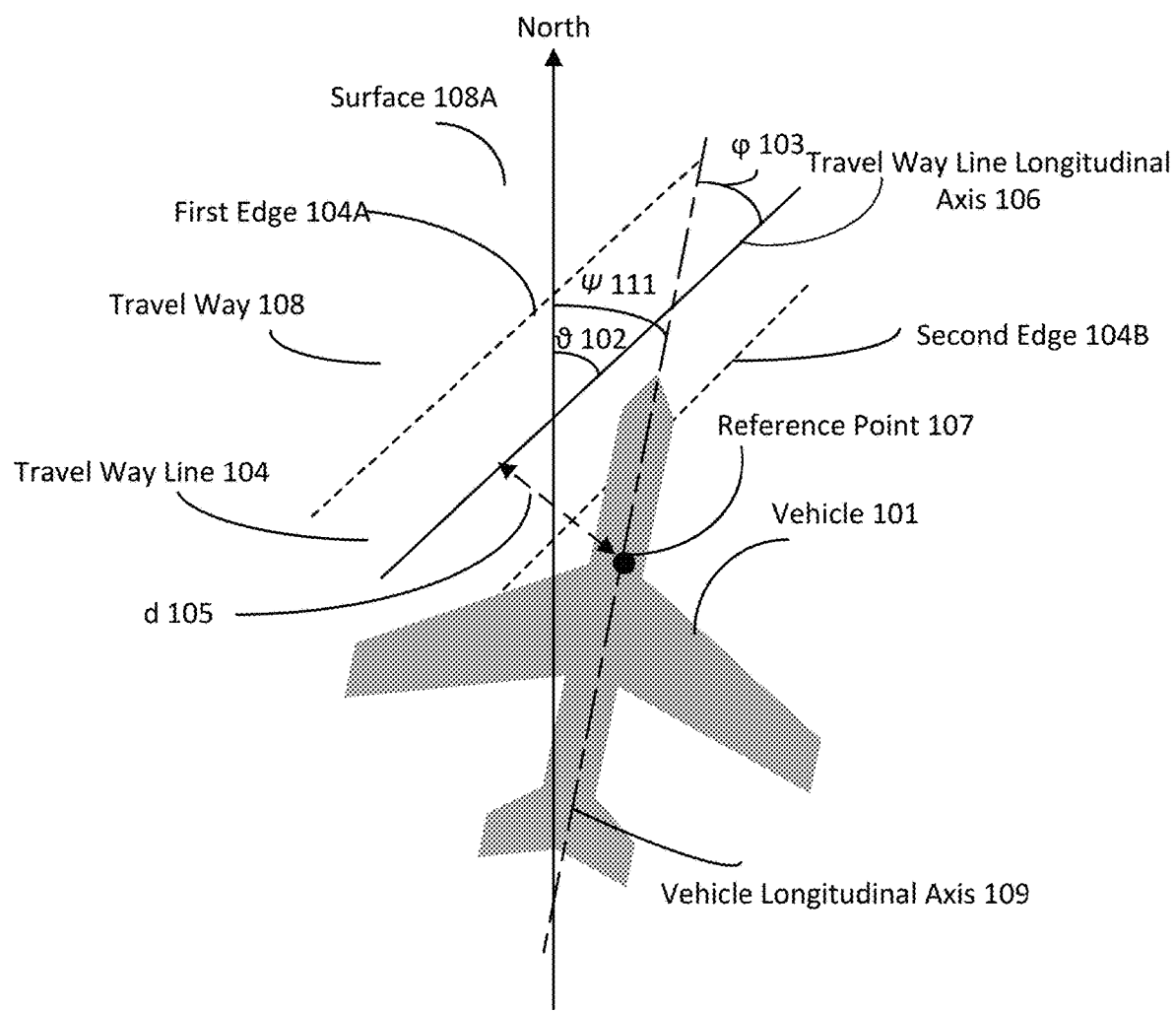
FIG. 1A illustrates a diagram of one embodiment of a vehicle by a travel way.

In the following detailed description, reference is made to the accompanying drawings that form a part hereof, and in which is shown by way of illustration specific illustrative embodiments. However, it is to be understood that other embodiments may be utilized, and that structural, mechanical, and electrical changes may be made. Furthermore, the method presented in the drawing figures and the specification is not to be construed as limiting the order in which the individual steps may be performed. The following detailed description is, therefore, not to be taken in a limiting sense. Also, it will be understood that when a device or signal is referred to as being "coupled" to an element, it can be coupled directly to the element, or intervening elements may also be present.

To more accurately determine kinematic state(s) of a vehicle, an imager can be used to measure the vehicle's angular orientation and position relative to line markings on a travel way. The system using such an imager can operate in GNSS-denied environments and thus increase the availability and accuracy of the vehicle's navigation system. The vision measurements of markings are agnostic to the effects of a vehicle, e.g., wheel slip, because, unlike odometers, vision measurements measure motion independent of movement of vehicle components, e.g., wheel rotation. Further, the vision navigation system, combined with pre-existing maps, e.g., of an airport, can estimate the vehicle's position relative to infrastructure and enable collision avoidance and operate in GNSS-denied environments.

Embodiments of the invention provide systems and methods to more accurately determine one or more kinematic states of a vehicle by utilizing an image of a line of a travel way (or travel way line). A kinematic state means a state describing position, velocity, and/or angular orientation. The determined one or more kinematic states of a vehicle include vehicle position, vehicle attitude, vehicle heading, and/or vehicle velocity. Vehicle position means vehicle altitude and vehicle horizontal position. Vehicle attitude means vehicle roll and vehicle pitch angles.

Using a travel way line longitudinal axis of the travel way extracted from an image, an angle with respect to a longitudinal axis of the vehicle and the travel way line longitudinal axis and a shortest distance between the travel way line longitudinal axis and a reference point on or in the vehicle are estimated. Optionally, the reference point may be located at a position of an inertial measurement unit (IMU), a navigation system, a cockpit, or a specific position of the pilot. The angle and the distance are quantities that define the axis of the vehicle and the reference point on or in the vehicle relative to a surface of the travel way, e.g., an airport surface. The estimated angle and distance can be fused with inertial data and additional data from additional one or more aiding devices to more accurately determine one or more kinematic states of the vehicle. By more accurately estimating a kinematic state of the vehicle, the crew and/or vehicle system(s), can reduce the risk of collision, e.g., when the navigation systems provides more accurate estimates of the vehicle's position, heading, attitude, and velocity. Further, downstream users or systems can make more precise decisions about potential collisions and optimize the use of collision avoidance maneuvers.

The vehicle may be an airborne vehicle (e.g., an aircraft or any other airborne vehicle), a spacecraft, a terrestrial vehicle (e.g., an automobile, truck, tank, or any other terrestrial vehicle), or any other type of vehicle. A travel way means a path on which, under which, over which, or next to the vehicle travels. Optionally and for example, the travel way may be a taxi way (e.g., at an airport) or a road. However, embodiments of the invention are applicable to other types of vehicles and travel ways.

FIG. 1A illustrates a diagram of one embodiment of a vehicle 101 by a travel way 108. In FIG. 1A, the vehicle 101 is illustrated with the outline of an aircraft for pedagogical purposes, and travels in the direction from the tail of the aircraft to the nose of the aircraft. The vehicle 101 need not touch the travel way as is the case with wheels of the aircraft being on the ground on or near the travel way; the vehicle 101 may travel at an altitude offset from the travel way, e.g., above, the travel way 108. However, in some embodiments, the vehicle 101, e.g., the wheels of the vehicle 101 contact the travel way 108. The travel way 108 is on a surface 108A.

A travel way line (or TWL) 104 is a solid or segmented line in the travel way 108. The travel way line 104 may be in the center of or offset from the center of the travel way 108. Optionally, the travel way line 104 may in a center of one lane of the travel way 108. The travel way line longitudinal axis 106 is a longitudinal axis lying between a first edge 104A and a second edge 104B of the travel way line 104 (or segment thereof). The first edge 104A and the second edge 104B are exterior edges of the travel way line 104 (or segment thereof) that delineate the width of the travel way line 104 (or segment thereof). The travel way line longitudinal axis 106 may be spaced equidistant between the first edge 104A and the second edge 104B; however, a travel way line longitudinal axis 106 that is not spaced equidistantly from the first and the second edges 104A, 104B may also be used. The travel way line 104 is used to determine the aforementioned angle and distance.

A longitudinal axis 109 of the vehicle 101 is at an angle $\varphi$ 103 with respect to a travel way line longitudinal axis 106 of a travel way line 104 of a travel way 108. The longitudinal axis 109 of the vehicle 101 means an axis through the body of the vehicle 101 from a rear of the vehicle 101 through the front of the vehicle 101 in a direction of travel of the vehicle 101; for aircraft, the longitudinal axis 109 of the vehicle 101 may also be referred to as a roll axis or the vehicle longitudinal axis 109.

The angle $\varphi$ 103 may range from minus one hundred eighty to positive one hundred eighty degrees (or zero to three hundred sixty degrees), and may be an angle with respect to the vehicle longitudinal axis 109 with a clockwise positive (or a clockwise negative) sense. A shortest distance d 105 is the shortest distance from a reference point 107 on or in the vehicle 101 to the travel way line longitudinal axis 106. The reference point 107 may also be referred to as the vehicle reference point. The shortest distance d 105 may be determined by drawing a line orthogonal to the travel way line longitudinal axis 106 that connects the reference point 107 orthogonally projected onto the surface 108A. The reference point 107 is located at an arbitrary position on or in the vehicle, e.g., along the vehicle longitudinal axis 109; however, reference point 107 need not be along the vehicle longitudinal axis 109.

A common reference convention must be used during analysis. One optional convention is subsequently exemplified; however alternative conventions may be used. The exemplary convention follows. The shortest distance d 105 may be positive if the travel way line longitudinal axis 106 is to the left hand side of the reference point 107 on the vehicle longitudinal axis 109. The shortest distance d 105 may be negative if the travel way line longitudinal axis 106 is to the right hand side of the reference point 107 on the vehicle longitudinal axis 109. If the travel way line longitudinal axis 106 is perpendicular to the vehicle longitudinal axis 109, then the shortest distance d 105 may be positive if the travel way line longitudinal axis 106 intersects the vehicle longitudinal axis 109 in front of the reference point 107 and may be negative if the travel way line longitudinal axis 106 intersects the vehicle longitudinal axis 109 behind the reference point 107. Angle $\vartheta$ 102 is a travel way line heading relative to North. Angle $\psi$ 111 is a heading of the vehicle relative to North.

Figure 1B:
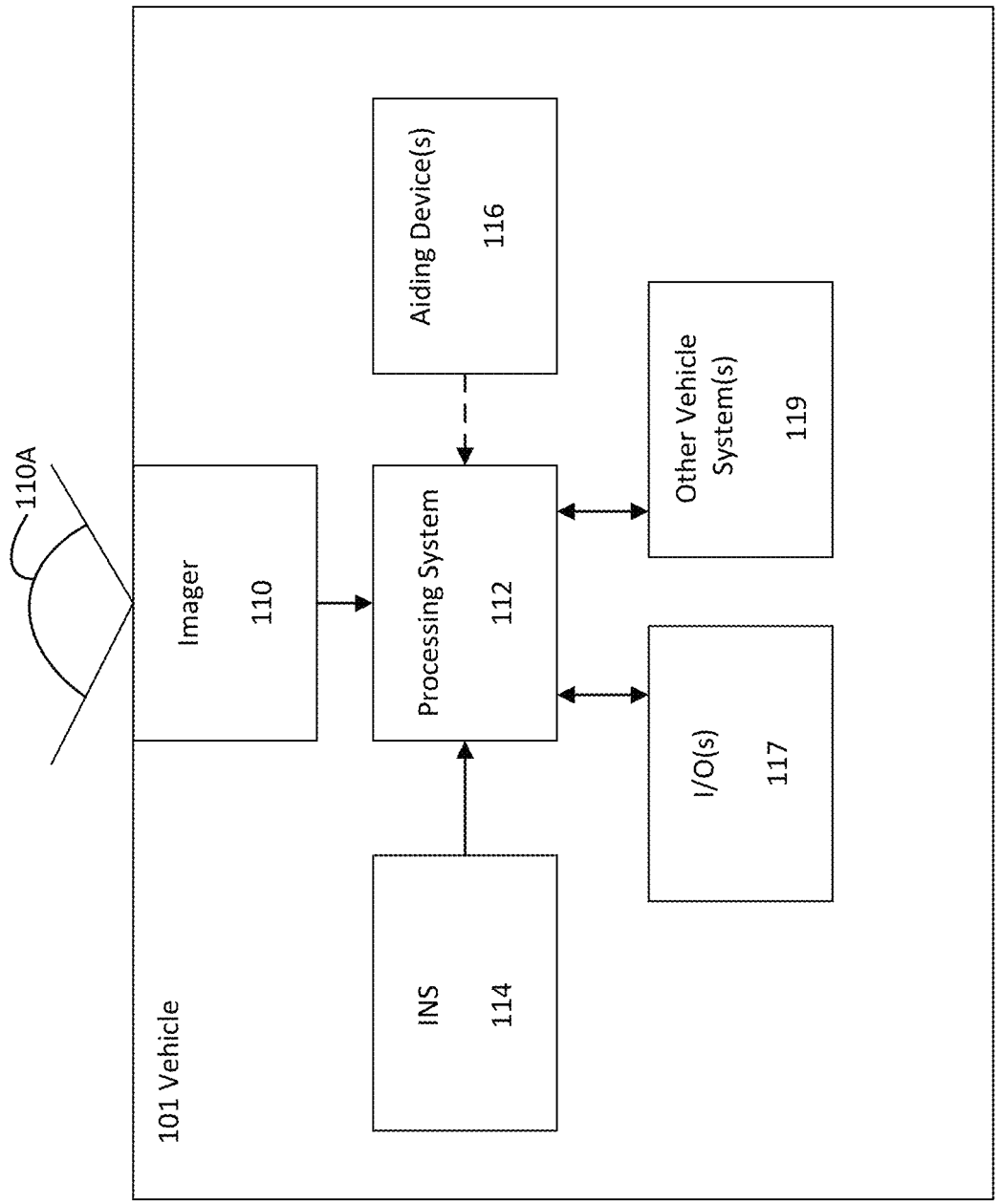
FIG. 1B illustrates a block diagram of one embodiment of an imager and processing system configured to be mounted in and/or on a vehicle.

Systems and methods for determining the angle $\varphi$ 103 and the shortest distance d 105, and utilizing such parameters to more accurately estimate kinematic states of a vehicle 101 will be subsequently illustrated. FIG. 1B illustrates a block diagram of one embodiment of an imager 110 and processing system 112 configured to be mounted in and/or on a vehicle 101. Optionally, the processing system 112 is configured to determine the angle $\varphi$ 103 and the shortest distance d 105 using an image captured by the imager 110; alternatively, or additionally, some or all of such determination may be performed by another processing system, e.g., not located on the vehicle 101.

The imager 110 has a field of view 110A within which it can image objects, e.g., a center line. The imager 110 may also be referred to as imager circuitry. The imager 110 may be an optical imager (e.g., a camera including one or more lenses or a LIDAR) or an imager that detects frequencies at other wavelengths. For example, if the travel way line 104 is formed with material that reflects millimeter wavelengths or lower wavelengths, then for example a RADAR, e.g., a millimeter wave RADAR, can be used as an imager 110; such a material may be, e.g., a paint with containing electrical conductor(s), for example in the form of metal flakes, The position of the imager 110 on or in the vehicle 101 and the position of the reference point 107 on or in the vehicle 101 are known. Thus, the vector position of the imager 110 relative to the position of the reference point 107 is also known. Such positions may be stored in the processing system 112.

The imager 110 is communicatively coupled to the processing system 112. Optionally, the processing system 112 is configured to execute the methods illustrated herein. The processing system 112 may also be referred to as processing circuitry or processing system circuitry. The processing system 112 may be implemented as a state machine and/or a neural network. Optionally, the processing system 112 may comprise processor circuitry communicatively coupled memory circuitry. Optionally, such methods may be implemented as program products configured to be executed on the processing system 112, e.g., the processor circuitry. Optionally, such program products may be stored in the memory circuitry and executed in the processor circuitry.

The processing system 112 is configured to be communicatively coupled to an inertial navigation system (INS or INS circuitry) 114. Optionally, the processing system 112 is configured to be communicatively coupled to at least one other aiding device (other aiding device(s) or other aiding circuitry) 116; the other aiding device(s) 116 are optional. Other aiding devices 116 may also be referred to herein as other aiding sensors. The imager 110 and the other aiding device(s) 116 aid the INS 114 to more accurately estimate the kinematic states of the vehicle 101, e.g., through usage of statistical estimator(s) such as Bayesian filter(s) or, more specifically, Kalman filter(s).

The INS 114 comprises at least one inertial measurement unit (IMU). Each IMU comprises at least one accelerometer (each of which is configured to measure an acceleration in a corresponding axis) and/or at least one gyroscope (each of which is configured to measure a rate of rotation about a corresponding axis). Optionally, the IMU comprises an accelerometer and a gyroscope for each of three orthogonal axes. The INS 114 is configured to determine velocity, position, heading, and attitude of the vehicle 101 using inertial measurements from the IMU. Thus, the processing system 112 is configured to receive velocity, position, heading, and attitude of the vehicle from the INS 114. Although FIG. 1B illustrates the use of an INS 114, at least one IMU may be used in lieu of the INS. The at least one IMU is configured to provide acceleration and/or rate of rotation in one or more axes. Thus, alternatively, the processing system 112 is configured to receive acceleration and/or rate of rotation in one or more axes from the IMU, and to determine velocity, position, heading, and attitude of the vehicle 101.

The optional other aiding device(s) 116 may be at least one GNSS receiver, at least one compass, at least one altimeter (e.g., a barometric altimeter), at least one gravimeter, at least one gravity gradiometer, at least one odometer, at least one very high frequency (VHF) omnidirectional range receiver (VOR) receiver, at least one distance measuring equipment (DME) receiver, at least one radar (e.g., at least one Doppler radar), and/or other device(s) configured to measure a parameter indicative of or corresponding to at least one kinematic state of the vehicle 101. Each GNSS receiver may be a Global Positioning System (GPS) receiver, a GLObal NAvigation Satellite System receiver, a BeiDou Navigation satellite system (BDS) receiver, a Galileo receiver, an Indian Regional Navigation Satellite System (IRNSS) receiver, or a receiver for another type of satellite navigation system. The GNSS receiver generates a pseudo range measurement for each satellite (of a corresponding satellite constellation) whose signal can be received by the GNSS receiver. Optionally, such pseudo range measurements can be made more accurate using a satellite based augmentation system and/or a ground based augmentation system. Each compass may be a magnetometer or other type of compass.

Optionally, the processing system 112 may be communicatively coupled to at least one input/output device (I/O(s)) 117 and/or at least one other vehicle system (other vehicle system(s)) 119. The I/O(s) 117 may include display(s) and/or audio system(s) which can be used to respectively display and emit respectively visual image(s) and/or audio signal(s) to inform crew of the vehicle 101 about kinematic state(s) of the vehicle determined according to embodiments of the invention. The I/O(s) 117 may also include controls, e.g., a yoke, a stick, pedal(s), and/or throttle control(s), to permit vehicle crew to control the kinematic states of the vehicle 101. The other vehicle system(s) 119 may include at least one control system, e.g., at least one autopilot, to automatically maneuver the vehicle based upon the kinematic state(s) determined according to embodiments of the invention.

Figure 2:
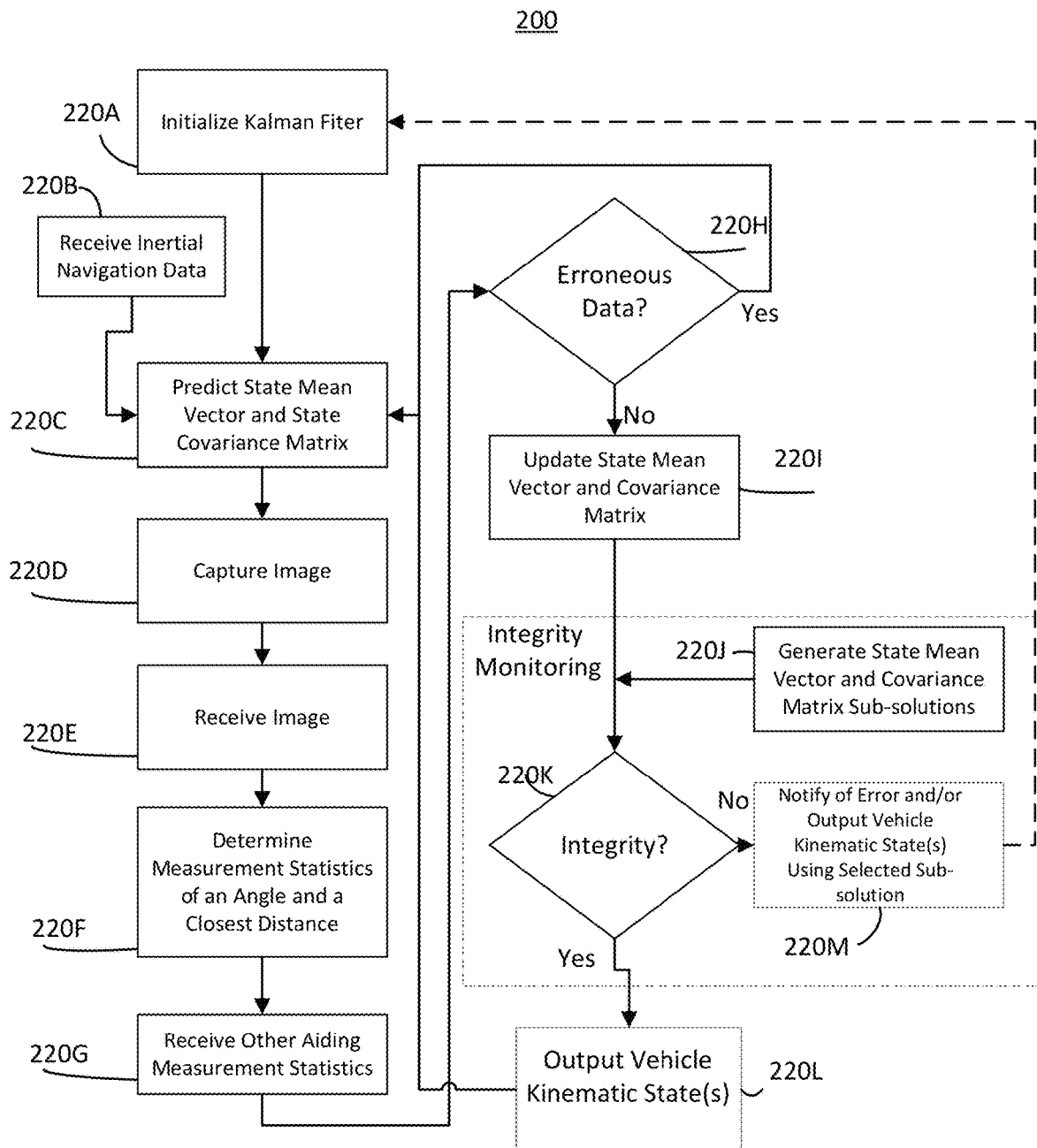
FIG. 2 illustrates a flow diagram of one embodiment of a method of determining at least one kinematic state of a vehicle.

FIG. 2 illustrates a flow diagram of one embodiment of a method 200 of estimating at least one kinematic state of a vehicle 101. To the extent the method 200 shown in FIG. 2 is described herein as being implemented in the systems shown in FIGS. 1A and 1B, it is to be understood that other embodiments can be implemented in other ways. The blocks of the flow diagrams illustrated herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

The illustrated embodiment uses at least one statistical filter, e.g., a Kalman filter, to estimate statistics of at least one vehicle kinematic state (e.g., vehicle position, vehicle heading, vehicle yaw, vehicle roll, vehicle pitch, and/or vehicle velocity), where the filter estimates these statistics using the inertial data and the aiding data (including the determined angle and the determined shortest distance). Kalman filters are an implementation of general Bayesian filters and are well known to those skilled in the art. The term Kalman filter shall include all variations of Kalman filter(s), including for example an extended Kalman filter, a second order Kalman filter, an unscented Kalman filter, constant-gain Kalman filters, or gain scheduled Kalman filters. Other forms of Bayesian filters include particle filters or point mass filters and they can be implemented in a variety of ways to estimate a state vector for global or local applications. The state vector to be estimated by the filter can include combinations of the vehicle's kinematic states and sensor parameters that capture the measurement model of the IMU and at least one aiding sensor. Although embodiments of the invention apply to statistical filters generally, embodiments of the invention will be illustrated herein, for pedagogical purposes, using Kalman filter(s).

A Bayesian filter is based on a two step approach. In the first or prediction step (or prediction block), the statistics of a state vector are propagated forward in time. In the second, or update step (or update block), the predicted statistics of a state vector are corrected or updated using the statistics of a measurement vector. The Kalman filter is based on a time propagation of the mean vector and covariance matrix of the state vector in the prediction step and on corrections of the predicted mean vector and covariance matrix of the state vector using the measurements vector and covariance matrix from the one or more aiding sensors (i.e., at least the imager) in the update step. During the update step, the state mean vector and the state covariance matrix are corrected using the measurement vectors and their covariance matrix.

Prior to commencing Kalman filtering, in block 220A, the Kalman filter is initialized with an initial state mean vector and an initial state covariance matrix. The initial statistics of elements of the state vector can be selected using a priori pre-selected values. The initial statistics of elements of the state vector with no a priori information can be selected using a zero mean and a large variance.

In block 220B, inertial navigation data is received. The IMU measurements include vehicle acceleration and angular velocity along or around different axes. Inertial navigation data includes data received from at least one inertial measurement unit, and data (which are the vehicle kinematic states) received from the inertial navigation system (or its equivalent).

In block 220C, the Kalman filter predicts, for a future time epoch, the state mean vector and the state covariance matrix utilizing inertial navigation data. The predicted state mean vector and the state covariance matrix may also be referred to herein as an estimated state mean vector and the state covariance matrix. In the prediction step, the Kalman filter receives the state mean vector and the state covariance matrix from the prior prediction step or from the update step and propagates the state vector statistics forward in time using a system dynamic model. Optionally, elements of the state vector estimated by the Kalman filter are kinematic states of the vehicle. Optionally, the state vector includes vehicle position (in two or three dimensions), vehicle heading, vehicle roll, vehicle pitch, and/or vehicle velocity (in two or three dimensions). The updated state vector statistics are determined during an update block 220I. The estimated state vector statistics may be used by crew and/or autopilot(s) to maneuver the vehicle in effect changing the value of one or more elements of the state vector. For example, if the estimated statistics of (a) position and/or (b) vehicle heading indicate that a vehicle is travelling or about to travel from a designated travel way, then the velocity vector of the vehicle may be changed by crew and/or an autopilot to prevent the vehicle from leaving the travel way. Such a change may be performed to avoid a collision, e.g., with a structure or other vehicle, and/or to maintain course on the travel way 108.

The prediction block 220C and the update block 220I (subsequently described) can be implemented in many different ways utilizing, e.g., different types of Kalman filters, frames of reference, aiding data, and/or state vector elements. Optionally, the state vector can include vehicle kinematic states and parameters corresponding to the IMU and at least one aiding sensor (i.e., at least the imager) and their associated measurement models. The Kalman filter can be implemented in either a direct approach or indirect approach using the error state vector. An optional example of a prediction block is subsequently illustrated for pedagogical purposes.

Optionally, in block 220D, the imager 110 captures an image which may include a travel way line 104 of a travel way 108. Optionally, the imager 110 captures the image when the travel way line 104 is in the field of view 110A of the imager 110. In at least one embodiment of the invention, the invention does not perform this optional block. In some instances, the captured image may not include a travel way line 104.

Figure 3:
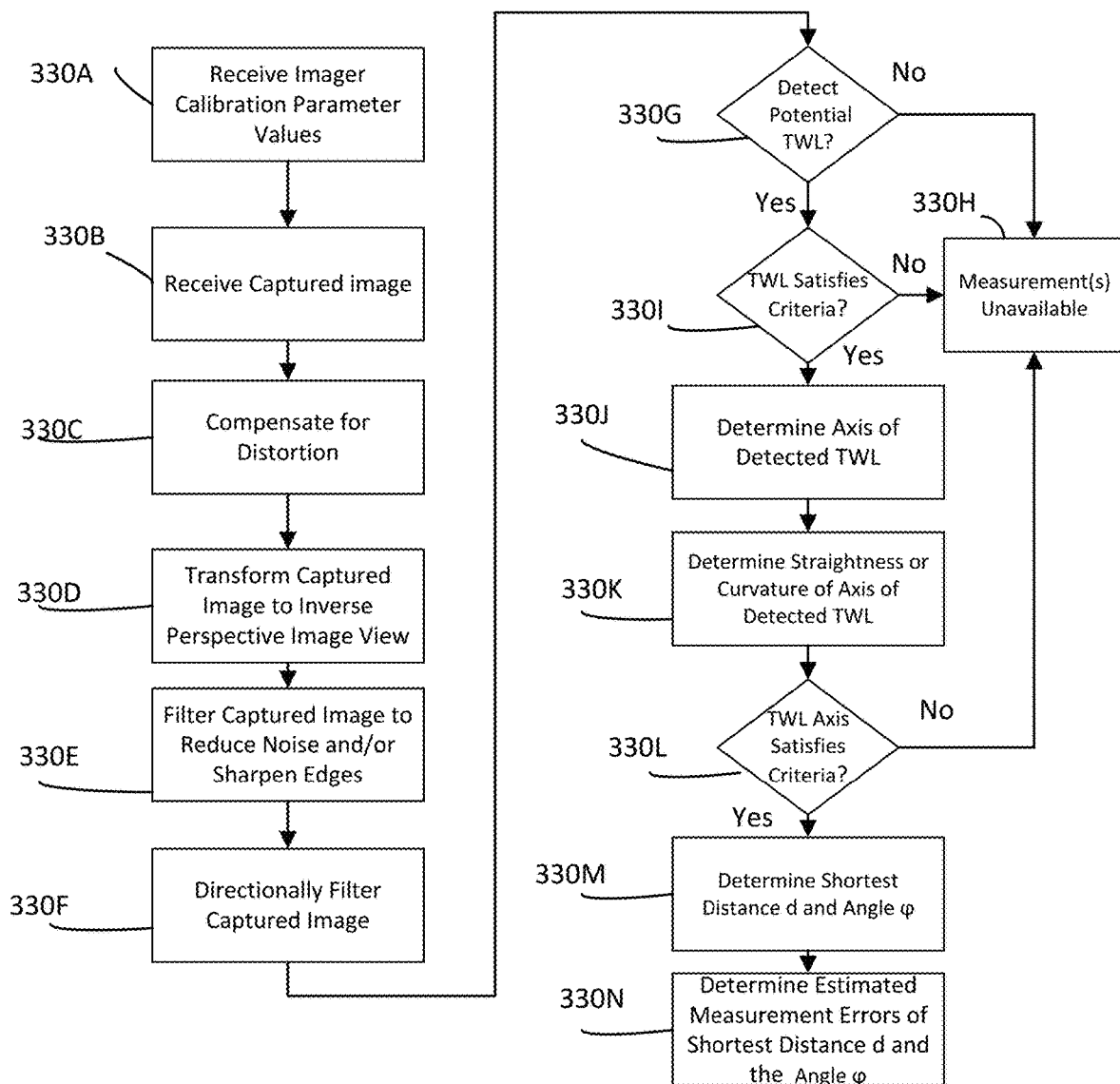
FIG. 3 illustrates a flow diagram of one embodiment of a method of how to determine measurement statistics for an angle between a longitudinal axis of a vehicle and a longitudinal axis of a travel way line, and a shortest distance between a reference point on a vehicle and a longitudinal axis of the travel way line.

In block 220E, the captured image (e.g., captured in optional block 220D) is received. Optionally, the processing system 112 receives the captured image (e.g., captured in optional block 220D) received from the imager 110. Note, not all received captured images include an image of a travel way line 104. FIG. 3, however, illustrates determining whether an image includes an image of a travel way line. The received captured image may also be referred to as a received image.

In block 220F, measurement statistics are determined for (a) an angle φ 103 between a longitudinal axis of the vehicle 101 and a longitudinal axis, e.g., the travel way line longitudinal axis 106, of the travel way line 104, and (b) a shortest distance d 105 between a reference point 107 on or in the vehicle 101 and the longitudinal axis of the travel way line. A segment of the travel way line longitudinal axis 106 may or may not be equidistant from the edges which define the travel way line. This block can be implemented in many different ways. An optional example of determining the measurement statistics of the angle and the shortest distance is subsequently illustrated for pedagogical purposes.

As is discussed elsewhere herein, determining the mean values and variances in block 220F that form the measurement vector and measurement covariance matrix also comprises first determining if an image of an actual travel way line is detected in the received image. Only if an actual travel way line is detected are the aforementioned values and variances then determined.

Optionally, in block 220F, if a travel way line is not detected in the image, and thus corresponding shortest distance d 105 and angle φ 103 measurements are unavailable, then proceed to the prediction block 220C. This is further described with respect to FIG. 3. If a travel way line is detected, then proceed to optional block 220G, optional block 220H, or update block 220I.

Optionally, in block 220G, measurement and/or related statistics are received from at least one other aiding device. Optionally, the measurement statistics may be, e.g., a pseudo range measurement for each satellite of the GNSS whose signal is detectable by the GNSS receiver. Additionally or alternatively, the other aiding measurements and/or related statistics may be provided from another type of aiding device such as direction from a compass.

Optionally, in block 220H, a check is implemented to determine if any of the measurement statistics are erroneous. Measurement statistics refer to the mean measurements and their variances of the angle and the shortest distance and the other aiding data. Optionally, the check may be implemented using a chi-squared test. Although the inclusion of measured data, e.g., image derived data, should generally increase the estimation accuracy of the state vector, erroneous measurements can cause estimation errors of the statistics of the state vector. Erroneous measurements may arise, e.g., when the lens of the imager and a crack in the lens is detected as the travel way line. Therefore, optionally, this block can check for such measurement errors before the update block 220I. If none of the measurement statistics are determined to be erroneous, then the update block 220I is performed. If at least one measurement statistic is determined to be erroneous, then the update block 220I is not performed, and proceed to the prediction block where the state mean vector and the state covariance matrix are predicted for a next time epoch. Optionally, after completing the update block 220I proceed to the prediction block 220C.

In block 220I, the predicted statistics of the state vector (i.e., the state mean vector and the state covariance matrix) are updated using the measurement statistics of the angle and shortest distance, and any aiding measurement statistics received from the optional additional aiding device(s) 116. The update block can be implemented in many different ways, e.g., using a Kalman filter. An optional example of the update block 220I, using a Kalman filter, is subsequently illustrated for pedagogical purposes. After completing block 220I, in block 220L output vehicle kinematic state(s) generated in update block 220I, and return to prediction block 220C. The outputted vehicle kinematic state(s) may be provided to vehicle crew, e.g., through a display, and/or to other vehicle system(s).

Optionally, thereafter, an integrity check is performed on the updated statistics of the state vector. If the integrity check is passed, then proceed to the prediction block 220C. If the integrity check is not passed, then proceed to block 220A to reinitialize the Kalman filter. An optional embodiment of the integrity checking is subsequently illustrated for pedagogical purposes. Integrity checking may also be referred to as integrity monitoring. Integrity monitoring is described in U.S. Patent Publication No. 20180283871 which is incorporated by reference herein in its entirety.

Optional integrity checking comprises the following blocks. Firstly, in block 220J, generate state mean vectors and covariance matrices of sub-solutions using the same type of statistical estimator used in block 220I, where each sub-solution is processing all measurement clusters but one measurement cluster.

Measurements from a plurality of different navigation aiding sources (i.e., the imager 110 and any optional additional aiding device(s) 116) are categorized by an information domain, an aiding class, and an aiding section. The information domain is a category of at least one of estimated states and measurements that represent a same physical category. The aiding class is a category that uses a same physical method to acquire measurements. The aiding section is a category of measurements from the same aiding source. The measurements from aiding devices are organized into a plurality of measurement clusters based at least in part on measurement fault modes to be detected, measurement fault modes to be excluded, available processing resources, and required performance. Measurement cluster means a set of one or more measurements or aiding data from one or more aiding devices.

In block 220K, perform integrity monitoring which comprises determining whether differences of statistics of state vectors of a full solution generated in block 220I and of each sub-solution generated in block 220J are each within a statistical bound. Bounds may change from time epoch to time epoch. Full solution means performing a Kalman filter using all measurement clusters. The statistical bound is determined using a covariance matrix of the full solution and a covariance matrix of a respective sub-solution.

When the integrity monitoring is determined to pass (i.e., difference statistics of the full solution and all sub-solutions fall within the corresponding bounds), then proceed to block 220L. When integrity monitoring is found to fail (i.e., the difference of statistics of the full solution and at least one sub-solution fall outside of the corresponding bounds), then in block 220M perform at least one of: (a) notify vehicle crew and/or at least one vehicle system that there is an error in the generated at least one vehicle kinematic state and (b) output at least one vehicle kinematic state generated by a Kalman filter excluding aiding data from aiding device(s) which generated measurements in the measurement cluster(s) determined to be faulty. The outputted vehicle kinematic state(s) may be provided to vehicle crew, e.g., through a display, and/or to other vehicle system(s). Then, proceed to block 220A to reinitialize the Kalman filter, including additionally to exclude the aiding data from the aiding device(s) which generate measurements in the measurement cluster(s) determined to be faulty.

Exemplary Prediction Block

An exemplary illustration of how to implement prediction block 220C is now provided for pedagogical reasons. During the prediction block, state vector statistics are predicted from time epoch k to (grouping all variables) time epoch k+1 according to the following equations:

$$\hat{x}_{k+1}' = F_k \hat{x}_k + G_k u_k$$

$$P_{k+1}' = F_k P_k F_k^T + Q_k$$

where:
$\hat{x}_{k+1}'$ is the predicted state mean vector at time epoch k+1;
$F_k$ is a discrete state transition matrix at time epoch k;
$\hat{x}_k$ is the estimated state mean vector at time epoch k. $\hat{x}_k$ is typically determined during the update step. However, if the update step is not performed at time epoch k, then $\hat{x}_k$ is derived from the prediction step and the state mean vector at time epoch k−1;
$G_k$ is an input transition matrix at time epoch k;
$u_k$ is an input vector at time epoch k;
$P_{k+1}'$ is the predicted state covariance matrix at time epoch k+1;
$P_k$ is the state covariance matrix at time epoch k;
$(\cdot)^T$ is the transpose of a matrix; and
$Q_k$ is a process noise covariance matrix at time epoch k.

Exemplary Update Block

An exemplary illustration of how to implement update block 220H is now provided for pedagogical reasons. The update block is performed when new measurements are available. During the update block, an estimated state mean vector at time epoch k+1, a state covariance matrix at time epoch k+1, and a Kalman gain matrix at time epoch k+1 are determined.

$$\hat{x}_{k+1} = \hat{x}_{k+1}' + K_{k+1} \tilde{y}_{k+1}$$

$$P_{k+1} (I - K_{k+1} H_{k+1}) P_{k+1}'$$

$$K_{k+1} = P_{k+1}' H_{k+1}^T / (H_{k+1} P_{k+1}' H_{k+1}^T + R_{k+1})$$

where:
$\hat{x}_{k+1}$ is the updated state mean vector at time epoch k+1;
$K_{k+1}$ is the Kalman gain matrix at time epoch k+1;
$\tilde{y}_{k+1}$ is an innovation, or a measurement residual, vector at time epoch k+1. The measurement residual vector is the difference between the measurement vector from an aiding device and the predicted measurement vector computed using $\hat{x}_{k+1}'$;
$P_{k+1}$ is the updated state covariance matrix at time epoch k+1;
I is an identity matrix with the same dimensions as $P_{k+1}$;
$H_{k+1}$ is a measurement matrix at time epoch k+1; and
$R_{k+1}$ is a measurement noise covariance matrix at time epoch k+1.

If there are no new measurements, then the predicted state vector statistics are not updated within the update block:

$$\hat{x}_{k+1} = \hat{x}_{k+1}'$$

$$P_{k+1} = P_{k+1}'$$

Error State Variables

A Kalman filter may be implemented using a state error vector corresponding to the state vector where the Kalman filter is used to estimate the statistics of the state error vector. In the update step, the state error vector and a corresponding state error covariance matrix are determined using the aiding sensor measurement statistics. The state vector is propagated outside the prediction steps of the Kalman filter. Following the update step of the Kalman filter, the current state vector is compensated using the state error vector to provide a more accurate estimate of the state vector statistics.

When using the error state vector, the Kalman filter may be optionally implemented as subsequently illustrated for pedagogical purposes. However, embodiments of the invention can also be implemented using a state vector and not a state error vector. When using a state error vector, one embodiment of the invention can be implemented as follows:

$$\hat{x} = \delta x$$

$$G_k = [A_d B_d C_d]$$

$$u_k = [\delta f^b \delta g^w \delta \omega_{ib}^b]^T$$

$$F_k = F_d$$

$$Q_k = A_d Q_f A_d^T + B_d Q_g B_d^T + C_d Q_w C_d^T$$

$$\delta x = [\delta r^w \delta v^w \psi^w \delta \vartheta \delta d]$$

where:
- i is an inertial reference frame;
- e is an Earth Centered Earth Fixed (ECEF) reference frame;
- b is a body, or vehicle, fixed reference frame;
- w is a wander reference frame which is a local level navigation frame rotated with respect to the local vertical axis by a wander angle;
- $\hat{x}$ is a state space vector;
- $G_k$ is an input transition matrix;
- $A_d$ is a discrete transition matrix of errors in the specific force vector expressed in a body fixed reference frame;
- $B_d$ is a discrete transition matrix of errors in gravity vector expressed in a wander reference frame;
- $C_d$ is a discrete direction cosine matrix consisting of errors in the angular rate vector between the inertial and the body reference frames;
- $u_k$ is an input vector;
- $\delta f^b$ is an error of a specific force vector expressed in a body reference frame;
- $\delta g^w$ is an error of a gravity vector expressed in a wander reference frame;
- $\delta \omega_{ib}^b$ is an error of an angular rate vector between an inertial reference frame and a body reference frame expressed in the body reference frame;
- $F_k$ is a discrete state transition matrix;
- $F_d$ is a discrete state transition matrix of inertial navigation errors;
- $Q_f$, $Q_g$, $Q_w$, are covariance matrices of $\delta f^b$, $\delta g^w$, $\delta \omega_{ib}^b$, respectively;
- $\delta x$ is the state error vector;
- $\delta r^w$ is a displacement position error vector expressed in a wander reference frame;
- $\delta v^w$ is a velocity error vector expressed in a wander reference frame;
- $\psi^w$ is a psi error angle vector, consisting of rotational errors which combine attitude and position errors, expressed in a wander reference frame;
- $\delta \vartheta$ is an error in travel way line heading; and
- $\delta d$ is an error of a shortest distance between the reference point and the travel way line longitudinal axis.

An optional and exemplary error of the shortest distance between the reference point 107 with respect to the travel way line longitudinal axis 106 will now be described. The derived error of the shortest distance can be included in state transition matrix F. An exemplary time propagation equation for a shortest distance of the reference point 107 with respect to the travel way line longitudinal axis 106 is:

$$\dot{d} = v_y^l = (C_w^l \cdot v^w)_y$$

$$C_w^l = \begin{bmatrix} \cos\vartheta & \sin\vartheta & 0 \\ -\sin\vartheta & \cos\vartheta & 0 \\ 0 & 0 & 1 \end{bmatrix} \Rightarrow v_y^l = -v_x^w \sin\vartheta + v_y^w \cos\vartheta$$

where:
- $\dot{d}$ is a time derivative of the shortest distance between the reference point 107 and the travel way line longitudinal axis 106;
- $v^l$ is a velocity vector expressed in a travel way line reference frame;
- $C_w^l$ is a direction cosine matrix from a wander reference frame to a travel way line reference frame;
- $v^w$ is a velocity vector expressed in a wander reference frame;
- $( )_y$ indicates a y component of a vector; and
- $\vartheta$ 102 is a travel way line heading relative to North.

A time propagation of the error of the shortest distance between the reference point 107 and the travel way line longitudinal axis 106 is then:

$$\delta \dot{d} = \delta v_y^l = (-v_x^w \cos\vartheta - v_y^w \sin\vartheta)\delta\vartheta + (-\sin\vartheta)\delta v_x^w + (\cos\vartheta)\delta v_y^w$$

where:
- $\delta \dot{d}$ is a time derivative of an error of the shortest distance between the reference point 107 and the travel way line longitudinal axis 106;
- $\delta v^l$ is a velocity error vector expressed in a travel way line reference frame;
- $\delta v^w$ is a velocity error vector expressed in a wander reference frame; and
- $( )_x$ indicates an x component of a vector.

The error in a shortest distance of the reference point 107 with respect to a travel way line longitudinal axis 106 is defined as:

$$\delta d = \hat{d} - d$$

where:
- $\hat{d}$ is an estimated shortest distance of the reference point 107 with respect to the travel way line longitudinal axis 106 determined during the prediction block; and An optional and exemplary error of the travel way line heading will now be described. The travel way line reference frame has an x axis forward along the direction of local travel way line, an z axis pointing down, and y axis completing the right-hand orthogonal frame. The origin of the travel way reference frame is located at the reference point 107. The error in travel way line heading is defined as:

$$\hat{\vartheta} = \vartheta + \delta\vartheta$$

where:
- $\hat{\vartheta}$ is an estimated travel way line heading relative to North computed during the prediction step.

If the travel way line heading is assumed to be constant, an exemplary time propagation model of the error of travel way line heading is then:

$$\delta \dot{\vartheta} = 0$$

where:
- $\delta \dot{\vartheta}$ is a time derivative of an error of a travel way line heading.

A continuous state transition matrix F accounting for the additional state elements to utilize the angle φ 103 and the shortest distance d 105 can be implemented. The continuous state transition matrix can then be discretized using conventional techniques.

A measurement model for the angle φ 103 between the vehicle longitudinal axis 109 and the travel way line longitudinal axis 106 is:

$$\tilde{\varphi} = \psi - \vartheta + \delta\varphi$$

where:
- $\tilde{\varphi}$ is a measured relative angle between the vehicle longitudinal axis 109 and the travel way line longitudinal axis 106;
- ψ 111 is a heading of the vehicle relative to North; and
- δφ is an error of the relative angle between the vehicle longitudinal axis 109 and the travel way line longitudinal axis 106.

The measurement residual component for the angle φ 103 between the vehicle longitudinal axis 109 and the travel way line longitudinal axis 106 is constructed as follows:

$$\tilde{y}^\varphi = \tilde{\varphi} - (\hat{\psi} - \hat{\vartheta})$$

where:
- $\tilde{y}^\varphi$ is a measurement residual of the angle between the vehicle longitudinal axis 109 and the travel way line longitudinal axis 106; and
- $\hat{\psi}$ is an estimated vehicle heading relative to North computed during the prediction block.

The measurement residual component for the shortest distance between the vehicle reference point 107 and the travel way line longitudinal axis 106 is constructed as follows:

$$\tilde{y}^d = \tilde{d} - \hat{d}$$

where:
- $\tilde{y}^d$ is a measurement residual of a shortest distance between a vehicle reference point 107 and the travel way line longitudinal axis 106; and
- $\tilde{d}$ is a measurement of the shortest distance between the vehicle reference point 107 and the travel way line longitudinal axis 106.

A measurement matrix H that defines the relationship between the measured angle $\tilde{\varphi}$, the measured distance $\tilde{d}$, and the state error vector can be implemented.

As mentioned above, the state vector and state error vector can include vehicle kinematic states, sensor specific parameters, or even states corresponding to the environment to improve filter performance. In this case, we augment the state vector and state error vector, which nominally consist of vehicle kinematic states, with additional state vector elements to include errors from the aiding sensors such as the imager 110 (and optionally the optional aiding devices 116 (e.g., GNSS receiver)) and additional state vector elements to include the travel way line heading relative to North, and the shortest distance d 105. The augmented initial state covariance matrix can be defined as:

$$P_0'' = \begin{bmatrix} P_0 & 0 & 0 & 0 \\ 0 & \text{var}(\delta t_{rec}) & 0 & 0 \\ 0 & 0 & \text{var}(\delta\vartheta) & 0 \\ 0 & 0 & 0 & \text{var}(\delta d) \end{bmatrix}$$

where:
- $P_0''$ is an augmented, initial state covariance matrix;
- $P_0$ is an initial state covariance matrix for the vehicle kinematic states;
- var(δ$t_{rec}$) is an initial variance of the error in the GNSS receiver clock;
- var(δϑ) is an initial variance of the travel way line heading relative to North; and
- var(δd) is an initial variance of the shortest distance between the vehicle reference point 107 and the travel way line longitudinal axis 106.

Exemplary Angle and Shortest Distance Determination

An exemplary illustration of how to implement block 220F is now provided for pedagogical reasons and is illustrated in FIG. 3. FIG. 3 illustrates a flow diagram of one embodiment of a method 320F of how to determine measurement statistics for an angle between the vehicle longitudinal axis 109 of a vehicle and the travel way line longitudinal axis 106, and a shortest distance between the reference point 107 on or in the vehicle 101 and the travel way line longitudinal axis 106. The illustrated embodiment describes an efficient and accurate technique for determining the measurement statistics for the angle and the shortest distance. Thus, e.g., the illustrated embodiment can be used to more efficiently and accurately to detect when a vehicle has or is about to leave its travel way. As a result, vehicle crew and/or autopilot(s) can correct coarse of the vehicle so that it can remain in its travel way and avoid injury. Although other imagers can be used, an imager that is a camera will be subsequently illustrated for pedagogical purposes. Images will be described as being composed of pixels; each pixel of an image may have one or more corresponding properties such as intensity.

Optionally, the imager 110 requires calibration which can be performed by determining imager calibration parameters which are determined using conventional techniques by imaging known image(s). The imager calibration parameters are used to compute the angle φ 103 and the shortest distance d 105. Such imager calibration parameters include intrinsic and extrinsic imager calibration parameters. Intrinsic parameters are used to compensate for distortion arising due to imperfections of the lens of the camera (i.e., distortion). Intrinsic imager calibration parameters include focal length, principal point position, and lens distortion parameter(s). Intrinsic imager calibration parameters depend only on the sensor and not on the vehicle. The extrinsic imager calibration parameters include imager position and imager angular orientation and are defined with respect to the vehicle, i.e., the vehicle body reference frame. The imager calibration parameters may be stored in (and later obtained from) the imager 110, the processing system 112, and/or in any other system (which may be remotely located from the vehicle 101).

Optionally, in block 330A, a value of at least one imager calibration parameter of the imager is received. One or more received imager calibration parameters may be used in performing one or more of blocks illustrated in FIG. 3, e.g., blocks 330C, 330D, 330E, 330J, 330M, and/or 330N.

Optionally, at least one imager calibration parameter is determined. Optionally, not all of the calibration parameters may be received in block 330A or calibration parameters may be recalculated due to variation in calibration parameters that occur over time. The calibration parameters can be determined by conventional means by imaging known image(s) to characterize distortion, e.g., of a lens, in the imager. The calibration parameter(s) may be stored in (and later obtained from) the imager 110, the processing system 112, and/or in any other system (which may be remotely located from the vehicle 101).

Optionally, in block 330B, the captured image is received. Blocks 330C through block 330N (with or without optional blocks) can be repeated for successive images received from the imager, e.g., as the vehicle (in or on which the imager is mounted) moves.

Optionally, in block 330C, the image for distortion caused by imperfections in the lens is compensated. Such distortion includes radial distortion and tangential distortion. Radial distortion is for example found in wide angle lenses. Lens distortion may be compensated in manners known to skilled persons in the art. For example, lens distortion can be corrected with Brown's distortion model. Distortion parameters of the lens may not be received as part of the received imager calibration parameter values and the compensation for distortion block 330C may not be performed for imagers when compensation for distortion is not required, e.g., when the distortion of the lens is relatively small.

In block 330D, the captured image (which may or may not be compensated pursuant to block 330C) is transformed to an inverse perspective image view. Such transformation is well known to one skilled in the art and may be performed, e.g., by multimodal inverse perspective mapping or homography. The resulting inverse perspective image view may also be referred to as a bird's eye view or plan view.

Optionally, in block 330E, the transformed, captured image is filtered to reduce noise in the image and/or to sharpen edges to aid with subsequent edge enhancement and edge direction determination of a travel way line. This may be alternatively referred to as: at least one of noise filtering and edge filtering. For example, noise filtering may be performed by computing the convolution of a noise filter kernel with the transformed, received image, where the noise filter kernel is a low pass filter kernel (e.g., a Gaussian or averaging filter kernel). Other filtering methods, such as median filtering, may be used. For edge sharpening, a different filter, e.g., a high pass filter kernel, can be used. Thus, two or more filters can be used to provide both noise and edge sharpening.

Optionally, in block 330F, the captured image (e.g., the noise filtered captured image or the transformed, captured image) is directionally filtered to determine enhanced edges in one or more directions (e.g., a horizontal direction and/or a vertical direction) to aid with subsequent edge direction determination. For example, optionally, directional filtering in one direction may be performed by computing the convolution of a directional filter kernel with the image, where the directional filter kernel is a filter kernel corresponding to the direction of interest.

In block 330G, the existence of a potential travel way line of the transformed captured image (which may have been optionally filtered as described herein) is determined by searching the captured image, e.g., by performing a Hough transform, a random sampling consensus algorithm, or another type of algorithm that determines whether a potential travel way line exists in the filtered image. A potential travel way line may also be referred to as a candidate travel way line. If no potential travel way line is detected in block 330G, then proceed to block 330H. In block 330H, it is communicated to the Kalman filter that measurement(s) are unavailable. As a result, the Kalman filter will not use measurements from the imager during the update step.

If a potential travel way line is detected in block 330G, then in block 330I, it is determined if the detected potential travel way line satisfies a first set of travel way line criteria defining a travel way line, e.g., by determining whether an indicia of a travel way line generated by the Hough transform or another algorithm exceeds a travel way line threshold level that defines a travel way line and/or whether parameters (e.g., width and/or length) of the determined potential travel way line are within corresponding limits that define a travel way line. If the detected potential travel way line does not satisfy the criteria defining a travel way line, then proceed to block 330H. Alternatively, if the detected potential travel way line satisfies the criteria, then an actual travel way line is presumed to have been detected and proceed to block 330J.

In block 330J, an axis (or travel way line longitudinal axis) of a detected travel way line in the captured image is determined. Block 330J may be implemented in different ways. An optional and exemplary embodiment is illustrated in FIG. 4 and subsequently described.

Figure 4:
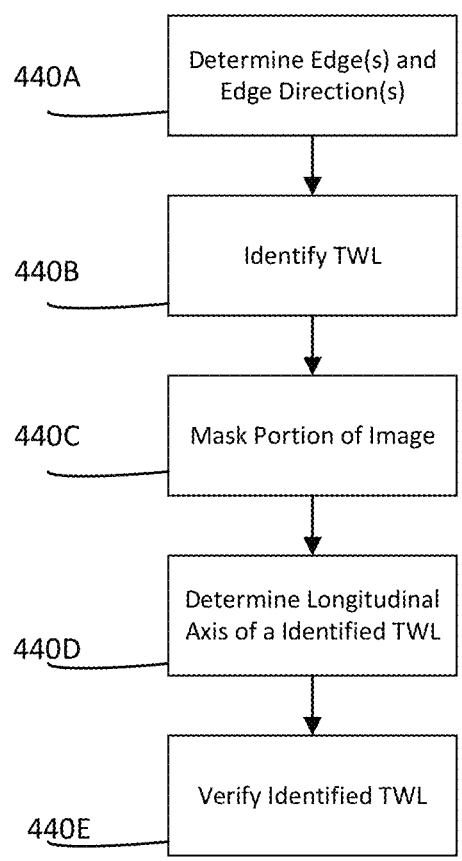
FIG. 4 illustrates a flow diagram of one embodiment of a method for determining a longitudinal axis of a travel way line in an image.

FIG. 4 illustrates a flow diagram of one embodiment of a method 430J for determining an axis of a travel way line in an image. In block 440A, edge(s) and corresponding edge direction(s) in the captured image (e.g., the transformed, captured image, the noise filtered, captured image, and/or the directionally filtered, captured image) are determined. Each edge and corresponding edge direction can be detected based upon determining a maximum image intensity gradient (i.e., corresponding to (a) a transition from light to dark or (b) transition from dark to light) in two orthogonal directions (e.g., x and y directions). One direction corresponds to the transition from light to dark, and an opposite direction corresponds to the transition from dark to light. For example, such edge and corresponding edge direction determination are performed by computing the convolution of the image with a convolution kernel, where the convolution kernel is a Sobel operator, a Prewitt operator, or other suitable kernel.

In block 440B, a travel way line satisfying a second set of travel way line criteria defining a travel way line, e.g., based upon travel way line width and/or pixel image characteristics is identified. Some optional and exemplary element(s) of the first set of travel way line criteria are:

(a) Check if the width of a line, formed by determined edges having opposite directions, within a range of widths corresponding to an expected travel way line. Note, a scale factor relating pixel to dimension in the plane of the surface 108A may be determined based upon imager calibration parameter values (received in block 330A) or a scale factor provided with the imager calibration parameter values received in block 330A;

(b) Check if a percentage of pixels, forming a line and having an intensity above a first threshold level, exceed a second threshold level. Optionally, the first threshold level may be an adaptive level, e.g., using the Chow and Kaneko approach or the local thresholding technique. The second threshold level may be implemented by a system designer or user; and/or (c) the analysis of (b) above may be performed based upon a different parameter of pixel(s) such as pixel color.

However, other alternative or additional elements may be utilized. Note, the travel way line identified in this block needs to be further evaluated to determine if it satisfies further criteria.

Optionally, in block 440C, a portion of the image outside of the identified travel way line is masked, e.g., so that pixels outside of the identified travel way line will not be further evaluated. For example, such extraction can be performed by multiplying the image with a mask where the pixels comprising the identified travel way line have a value of one (or zero) and pixels elsewhere in the image have a value of zero (or respectively one). Thus, for example, pixels (in a masked portion) outside of the identified travel way line may have their intensity set to zero, and pixels (in an unmasked portion) inside the portion of the image with the identified travel way line may have their intensity untouched or set to one.

In block 440D, in the unmasked portion, an axis (or travel way line longitudinal axis) of travel way line is determined, e.g., position of pixels forming the axis. The axis may be in the center of the travel way line or shifted to one side of the travel way line. For pedagogical purposes, a technique for determining the travel way line axis in the center of the travel way line is provided. Optionally, in one embodiment, a travel way line axis point position [xcnt, ycnt] is computed using mathematical moments and image intensities f(xi,yi) at pixel positions (xi,yi) between two travel way line edges, where Npoints is the number of points used to compute the travel way line axis point position:

$$xcnt = \frac{\sum_{i=1}^{Npoints} x_i f(xi, yi)}{\sum_{i=1}^{Npoints} f(xi, yi)}, y_{cnt} = \frac{\sum_{i=1}^{Npoints} y_i f(xi, yi)}{\sum_{i=1}^{Npoints} f(xi, yi)}$$

Other techniques may be utilized to determine the axis of the travel way line.

In block 440E, the identified travel way line is verified to be a travel way line by ensuring that the travel way line satisfies a third set of criteria defining a travel way line, e.g., based upon travel way line length, travel way line direction, and/or travel way line straightness, curvature, etc. Thus, at least one of the following criteria must be satisfied:
(a) the travel way line length is greater than a length threshold level, which may be set by a system designer or system user;
(b) the direction of the travel way line is within a certain range of angles of the vehicle longitudinal axis 109;
(c) the travel way line straightness is within a straightness threshold level, or the travel way line curvature is within a curvature threshold level; and
(d) the travel way line matches the shape of a travel way line in a database (or map) of travel way lines corresponding to the location of the vehicle. Thus, for example, if the processing system 112 can communicatively access a database including travel way lines stored with respect to position, then the processing system 112 can determine the position of the vehicle using IMU, INS, and/or GNSS receiver data and retrieve corresponding travel way line data so that it can compare the shape of the travel way line detected with the imager and the shape of the travel way line from data obtained from the database.

Returning to FIG. 3, optionally, in block 330K, a straightness or a curvature of the axis of the detected travel way line is determined. The straightness, for example, may be determined by performing a Hough transform, or spline fitting using random sample consensus, on the points of the determined axis. Curvature, for example, may be determined by spline fitting. Then, optionally, in block 330L, it is determined whether the straightness or curvature of the axis of the detected travel way line satisfies respective criteria, e.g., respectively exceeds a corresponding straightness or curvature threshold(s). In some embodiments, measurements used by the Kalman filter may only be applicable if the detected travel way line is sufficiently straight. Thus, if the straightness or curvature are greater than a corresponding straightness or curvature threshold (block 330H).

In block 330M, the shortest distance d 105 (from a reference point 107 on or in the vehicle 101 or projected on the surface 108A) and the angle φ 103 (with respect to the determined travel way line longitudinal axis 106) are determined.

The angle φ 103 may be determined by taking an arccosine of a dot product of a unit vector projected along the vehicle longitudinal axis 109 and a unit vector projected along the travel way line longitudinal axis 106, or taking an arctangent of the vector of the vehicle longitudinal axis 109 and the vector of the travel way line longitudinal axis 106.

Optionally, the shortest distance d 105 and the angle φ 103 can be determined as follows. A three dimensional coordinate system is used that is oriented North (n), East (e), Down (d); North is a forward axis, East is right axis, Down is an axis orthogonal to the surface 108A on which the travel way 108 resides, and represents a height above the surface 108A, i.e., points lying on the surface 108A have a down coordinate (down) equal to zero. Optionally, other local horizontal, local vertical coordinate systems can be used.

In the aforementioned coordinate system, P0=[P0n, P0e, P0d] are the coordinates of the position of the sensor. By subtracting the height of the sensor above the surface 108A (P0d) from the last coordinate of point P0, point P0 is projected onto the surface 108A ([P0n, P0e, 0]). [P0n, P0e] is a two dimensional coordinate of the point P0 projected onto the surface 108A. When P1=[P1n, P1e, P1d] and P2=[P2n, P2e, P2d] are three dimensional coordinates of two distinct points on the determined travel way line longitudinal axis, then P1=[P1n, P1e, 0] and P2=[P2n, P2e, 0] because the detected travel way line (and thus the determined travel way line longitudinal axis) are also on the surface 108A. Then, the shortest distance d 105 of the point P0 projected onto the surface 108A from the two points P1 and P2 on the detected travel way line is:

$$d = \frac{((P2n - P1n) * (P1e - P0e) - (P1n - P0n) * (P2e - P1e))}{sqrt((P2n - P1n)^2 + (P2e - P1e)^2)}.$$

The angle φ 103 is:

$$\varphi = a\tan(v2 \cdot e/v2 \cdot n) - a\tan(v \cdot e/v0 \cdot n)$$

where:
v0=(1,0,0) is a vector v0 representing a direction of longitudinal axis of the vehicle 101 (i.e., looking forward v0·n=1, v0·e=0, v0·d=0);
v2=P2−P1 is a vector formed from two points P1 and P2 on the determined travel way line longitudinal axis;
v2·n=P2n−P1n is a North component of the vector v2;
v2·e=P2e−P1e is an East component of the vector v2; and
v2·d=0 is a Down component of the vector v2, i.e., a point on the surface 108A.

Optionally, arccosine can be used to compute the angle φ 103. The determined values of the shortest distance d 105 and the angle φ 103 described herein may also be referred to as mean values of shortest distance d 105 and the angle φ 103.

In block 330N, the estimated measurement errors for the shortest distance d 105 and the angle φ 103 are determined. Optionally, in one embodiment, the measurement errors are:

$$\text{err } d = (J_d * \text{CovMat} * J_d^T)^{1/2}$$

$$\text{err}\varphi = (J_\varphi * \text{CovMat} * J_\varphi^T)^{1/2}$$

where $J_d$ and $J_\varphi$ are Jacobian matrices for distance d 105 and angle φ 103 respectively, and CovMat is a covariance matrix. The estimated measurement errors for the shortest distance d 105 and the angle φ 103 described herein may also be referred to as variances of the shortest distance d 105 and the angle φ 103. These variances can be used to generate the measurement covariance matrix R.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, e.g., optionally the processor circuitry. Generally, program modules or applications include routines, programs, objects, data components, data structures, algorithms, and the like, which perform particular tasks or implement particular abstract data types.

EXAMPLE EMBODIMENTS

Example 1 includes a method of determining at least one state variable of a vehicle by a travel way, comprising: initializing a statistical estimator with an initial state mean vector and an initial state covariance matrix; receiving inertial navigation data; predicting, for a future time epoch, a state mean vector and a state covariance matrix for a state vector of the statistical estimator using the inertial navigation data; receiving an image; determining measurement statistics for (a) an angle between a longitudinal axis of the vehicle and a longitudinal axis of a travel way line, and (b) a shortest distance between a reference point on or in the vehicle and the longitudinal axis of the travel way line; determining whether any of the measurement statistics are erroneous; upon determining that none of the measurement statistics are erroneous, then updating predicted statistics of the state vector using the determined measurement statistics of the angle and the shortest distance, wherein the state vector comprises at least one vehicle kinematic state; and providing at least one vehicle kinematic state to at least one of a flight crew and a vehicle system.

Example 2 includes the method of Example 1, wherein elements of the state mean vector comprise at least one of: a vehicle position in two or three dimensions, a vehicle heading, a vehicle roll, a vehicle pitch, and a vehicle velocity.

Example 3 includes the method of any of Examples 1-2, further comprising: detecting whether a travel way line is in the image; upon determining that a travel way line is in the image, then determining the measurement statistics; and upon determining that a travel way line is not in the image, then predicting for another future time epoch the state mean vector and the state covariance matrix.

Example 4 includes the method of any of Examples 1-3, further comprising: receiving measurement statistics from other aiding data, and wherein updating the predicted statistics of the state mean vector and the state covariance matrix comprises updating the predicted statistics of the state mean vector and the state covariance matrix using the determined measurement statistics of the angle and the shortest distance and the measurement statistics from other aiding data.

Example 5 includes the method of any of Examples 1-4, further comprising: after updating the predicted statistics, generating state mean vectors and covariance matrices of sub-solutions, wherein each state mean vector and covariance matrix for a sub-solution is generated with a statistical estimator using aiding data from all measurement clusters but one measurement cluster, wherein a measurement cluster comprises a set of one or more measurements from one or more aiding devices; determining whether differences of statistics of state vectors of a full solution and of each sub-solution are each within a statistical bound, wherein the statistical bound is determined using a covariance matrix of the full solution and a covariance matrix of a respective sub-solution, and wherein a full solution is obtained by performing statistical estimation using all measurement clusters; and upon determining that at least one difference is not within a corresponding statistical bound, then performing at least one of: (a) notifying, at least one of vehicle crew and at least one vehicle system, that there is an error in generated at least one vehicle kinematic state and (b) providing at least one vehicle kinematic state, to at least one of vehicle crew and at least one vehicle system, generated by a statistical estimator excluding aiding data from at least one aiding device whose measurements were determined to be faulty.

Example 6 includes the method of any of Examples 1-5, further comprising capturing the image.

Example 7 includes the method of any of Examples 1-6, wherein the statistical estimator comprises a Kalman filter.

Example 8 includes a program product comprising a non-transitory processor readable medium on which program instructions are embodied, wherein the program instructions are configured, when executed by at least one programmable processor, to cause the at least one programmable processor to: initialize a statistical estimator with an initial state mean vector and an initial state covariance matrix; receive inertial navigation data; predict, for a future time epoch, a state mean vector and a state covariance matrix for a state vector of the statistical estimator using the inertial navigation data; receive an image; determine measurement statistics for (a) an angle between a longitudinal axis of the vehicle and a longitudinal axis of a travel way line, and (b) a shortest distance between a reference point on or in the vehicle and the longitudinal axis of the travel way line; determine whether any of the measurement statistics are erroneous; upon determine that none of the measurement statistics are erroneous, then updating predicted statistics of the state vector using the determined measurement statistics of the angle and the shortest distance, wherein the state vector comprises at least one vehicle kinematic state; and provide at least one vehicle kinematic state to at least one of a flight crew and a vehicle system.

Example 9 includes the program product of Example 8, wherein elements of the state mean vector comprise at least one of: a vehicle position in two or three dimensions, a vehicle heading, a vehicle roll, a vehicle pitch, and a vehicle velocity.

Example 10 includes the program product of any of Examples 8-9, wherein the program instructions are configured, when executed by at least one programmable processor, to further cause the at least one programmable processor to: detect whether a travel way line is in the image; upon determining that a travel way line is in the image, then determine the measurement statistics; and upon determining that a travel way line is not in the image, then predict for another future time epoch the state mean vector and the state covariance matrix.

Example 11 includes the program product of any of Examples 8-10, wherein the program instructions are configured, when executed by at least one programmable processor, to further cause the at least one programmable processor to: receive measurement statistics from other aiding data, and wherein update the predicted statistics of the state mean vector and the state covariance matrix comprises update the predicted statistics of the state mean vector and the state covariance matrix using the determined measurement statistics of the angle and the shortest distance and the measurement statistics from other aiding data.

Example 12 includes the program product of any of Examples 8-11, wherein the program instructions are configured, when executed by at least one programmable processor, to further cause the at least one programmable processor to: after updating the predicted statistics, generate state mean vectors and covariance matrices of sub-solutions, wherein each state mean vector and covariance matrix for a sub-solution is generated with a statistical estimator using aiding data from all measurement clusters but one measurement cluster, wherein a measurement cluster comprises a set of one or more measurements from one or more aiding devices; determine whether differences of statistics of state vectors of a full solution and of each sub-solution are each within a statistical bound, wherein the statistical bound is determined using a covariance matrix of the full solution and a covariance matrix of a respective sub-solution, and wherein a full solution is obtained by performing statistical estimation using all measurement clusters; and upon determining that at least one difference is not within a corresponding statistical bound, then perform at least one of: (a) notifying, at least one of vehicle crew and at least one vehicle system, that there is an error in generated at least one vehicle kinematic state and (b) providing at least one vehicle kinematic state, to at least one of vehicle crew and at least one vehicle system, generated by a statistical estimator excluding aiding data from at least one aiding device whose measurements were determined to be faulty.

Example 13 includes the program product of any of Examples 8-12, wherein the statistical estimator comprises a Kalman filter.

Example 14 includes a system configured to be mounted at least one of on a vehicle and in a vehicle, comprising: processing circuitry; an imager configured to capture an image and communicatively coupled to the processing circuitry; at least one of an inertial measurement unit and an inertial navigation system communicatively coupled to the processing circuitry; another aiding device communicatively coupled to the processing circuitry; and wherein the processing circuitry is configured to: initialize a statistical estimator with an initial state mean vector and an initial state covariance matrix; receive inertial navigation data; predict, for a future time epoch, a state mean vector and a state covariance matrix for a state vector of the statistical estimator using the inertial navigation data; receive an image; determine measurement statistics for (a) an angle between a longitudinal axis of the vehicle and a longitudinal axis of a travel way line, and (b) a shortest distance between a reference point on or in the vehicle and the longitudinal axis of the travel way line; determine whether any of the measurement statistics are erroneous; upon determine that none of the measurement statistics are erroneous, then updating predicted statistics of the state vector using the determined measurement statistics of the angle and the shortest distance, wherein the state vector comprises at least one vehicle kinematic state; and provide at least one vehicle kinematic state to at least one of a flight crew and a vehicle system.

Example 15 includes the system of Example 14, further comprising: at least one other aiding device coupled to the processor circuitry; wherein the processor circuitry is further configured to receive measurement statistics from other aiding data, and wherein update the predicted statistics of the state mean vector and the state covariance matrix comprises update the predicted statistics of the state mean vector and the state covariance matrix using the determined measurement statistics of the angle and the shortest distance and the measurement statistics from other aiding data.

Example 16 includes the system of any of Examples 14-15, wherein elements of the state mean vector comprise at least one of: a vehicle position in two or three dimensions, a vehicle heading, a vehicle roll, a vehicle pitch, and a vehicle velocity.

Example 17 includes the system of any of Examples 14-16, further comprising: autopilot circuitry communicatively coupled to the processing circuitry; and wherein the autopilot circuitry is configured to receive at least one state mean vector from the processing circuitry and to use the received at least one state mean vector to change at least one kinematic state of the vehicle.

Example 18 includes the system of any of Examples 14-17, wherein the processing circuitry is further configured to: detect whether a travel way line is in the image; upon determining that a travel way line is in the image, then determine the measurement statistics; and upon determining that a travel way line is not in the image, then predict for another future time epoch the state mean vector and the state covariance matrix.

Example 19 includes the system of any of Examples 14-18, wherein the processing circuitry is further configured to: after updating the predicted statistics, generate state mean vectors and covariance matrices of sub-solutions, wherein each state mean vector and covariance matrix for a sub-solution is generated with a statistical estimator using aiding data from all measurement clusters but one measurement cluster, wherein a measurement cluster comprises a set of one or more measurements from one or more aiding devices; determine whether differences of statistics of state vectors of a full solution and of each sub-solution are each within a statistical bound, wherein the statistical bound is determined using a covariance matrix of the full solution and a covariance matrix of a respective sub-solution, and wherein a full solution is obtained by performing statistical estimation using all measurement clusters; and upon determining that at least one difference is not within a corresponding statistical bound, then perform at least one of: (a) notifying, at least one of vehicle crew and at least one vehicle system, that there is an error in generated at least one vehicle kinematic state and (b) providing at least one vehicle kinematic state, to at least one of vehicle crew and at least one vehicle system, generated by a statistical estimator excluding aiding data from at least one aiding device whose measurements were determined to be faulty.

Example 20 includes the system of any of Examples 14-19, wherein the statistical estimator comprises a Kalman filter.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method comprising:
providing processing circuitry in a vehicle, an imager on the vehicle and coupled to the processing circuitry, one or more aiding devices on the vehicle and coupled to the processing circuitry, and an inertial navigation system in the vehicle and coupled to the processing circuitry;
initializing a statistical estimator, in the processing circuitry, with an initial state mean vector and an initial state covariance matrix;
receiving inertial navigation data in the processing circuitry from the inertial navigation system;
predicting, in the processing circuitry, for a future time epoch, a state mean vector and a state covariance matrix for a state vector of the statistical estimator using the inertial navigation data;
receiving an image in the processing circuitry from the imager, the image including a ground travel way line for the vehicle, the image utilized by the processing circuitry to determine a position of the vehicle relative to the travel way line and an angular orientation of the vehicle relative to the travel way line;
determining, in the processing circuitry, measurement statistics for (a) an angle between a longitudinal axis of the vehicle and a longitudinal axis of the travel way line, and (b) a shortest distance between a reference point on or in the vehicle and the longitudinal axis of the travel way line;
receiving measurement statistics in the processing circuitry from the one or more aiding devices;
determining, in the processing circuitry, whether any of the measurement statistics from the one or more aiding devices are erroneous;
upon determining that all of the measurement statistics from the one or more aiding devices are erroneous, then outputting predicted statistics of the state vector, in the processing circuitry, wherein the state vector comprises at least one vehicle kinematic state;
upon determining that the measurement statistics from at least one of the one or more aiding devices are not erroneous, then updating predicted statistics of the state vector, in the processing circuitry, using the determined measurement statistics of the angle and the shortest distance, wherein the state vector comprises at least one vehicle kinematic state;
clustering the imager and the one or more aiding devices into physical categories of aiding sensors;
performing integrity monitoring in the processing circuitry to assure integrity of the at least one vehicle kinematic state by a process comprising:
performing solution separation using the clusters of aiding sensors to generate state mean vector and state covariance matrix sub-solutions;
identifying faulty aiding sensor measurements or faulty aiding sensors by statistically comparing the state mean vector and state covariance matrix sub-solutions in different combinations using the position of the vehicle relative to the travel way line and the angular orientation of the vehicle relative to the travel way line; and
outputting vehicle kinematic state statistics that do not use the faulty aiding sensor measurements or the faulty aiding sensors; and
providing the at least one vehicle kinematic state to at least one of a crew of the vehicle and a vehicle system, to aid in collision avoidance for the vehicle, and to aid in maintaining course of the vehicle along the travel way line.

2. The method of claim 1, wherein elements of the state mean vector comprise at least one of: a vehicle position in two or three dimensions, a vehicle heading, a vehicle roll, a vehicle pitch, and a vehicle velocity.

3. The method of claim 1, further comprising:
detecting whether a travel way line is in a successive image;
upon determining that a travel way line is in the successive image, then determining the measurement statistics; and
upon determining that a travel way line is not in the successive image, then predicting for another future time epoch the state mean vector and the state covariance matrix.

4. The method of claim 1, wherein:
updating the predicted statistics comprises updating predicted statistics of the state mean vector and the state covariance matrix using the determined measurement statistics of the angle and the shortest distance.

5. The method of claim 1, wherein:
each state mean vector and state covariance matrix sub-solution is generated with a statistical estimator using aiding data from all measurement clusters but one measurement cluster, wherein a measurement cluster comprises a set of one or more measurements from one or more of the aiding sensors;
determining whether differences of statistics of state vectors of a full solution and of each sub-solution are each within a statistical bound, wherein the statistical bound is determined using a covariance matrix of the full solution and a covariance matrix of a respective sub-solution, and wherein a full solution is obtained by performing statistical estimation using all measurement clusters; and
upon determining that at least one difference is not within a corresponding statistical bound, then performing at least one of: (a) notifying, at least one of the vehicle crew and the vehicle system, that there is an error in at least one vehicle kinematic state and (b) providing at least one vehicle kinematic state, to at least one of the vehicle crew and the vehicle system, generated by a statistical estimator excluding aiding data from any aiding sensor whose measurements were determined to be faulty.

6. The method of claim 1, further comprising capturing the image.

7. The method of claim 1, wherein the statistical estimator comprises a Kalman filter.

8. A non-transitory program product comprising a non-transitory processor readable medium on which program instructions are embodied, wherein the program instructions are configured, when executed by at least one programmable processor, to cause the at least one programmable processor to:
initialize a statistical estimator with an initial state mean vector and an initial state covariance matrix;
receive inertial navigation data;
predict, for a future time epoch, a state mean vector and a state covariance matrix for a state vector of the statistical estimator using the inertial navigation data;
receive an image from an imager, the image including a ground travel way line for a vehicle, the image utilized by the processing circuitry to determine a position of the vehicle relative to the travel way line and an angular orientation of the vehicle relative to the travel way line;
determine measurement statistics for (a) an angle between a longitudinal axis of the vehicle and a longitudinal axis of the travel way line, and (b) a shortest distance between a reference point on or in the vehicle and the longitudinal axis of the travel way line;
receive measurement statistics from one or more aiding devices;
determine whether any of the measurement statistics from the one or more aiding devices are erroneous;
upon determining that all of the measurement statistics from the one or more aiding devices are erroneous, then output predicted statistics of the state vector, wherein the state vector comprises at least one vehicle kinematic state;
upon determining that the measurement statistics from at least one of the one or more aiding devices are not erroneous, then update predicted statistics of the state vector using the determined measurement statistics of the angle and the shortest distance, wherein the state vector comprises at least one vehicle kinematic state;
cluster the imager and the one or more aiding devices into physical categories of aiding sensors;
perform integrity monitoring to assure integrity of the at least one vehicle kinematic state by a process comprising:
performing solution separation using the clusters of aiding sensors to generate state mean vector and state covariance matrix sub-solutions;
identifying faulty aiding sensor measurements or faulty aiding sensors by statistically comparing the state mean vector and state covariance matrix sub-solutions in different combinations using the position of the vehicle relative to the travel way line and the angular orientation of the vehicle relative to the travel way line; and
outputting vehicle kinematic state statistics that do not use the faulty aiding sensor measurements or the faulty aiding sensors; and
provide the at least one vehicle kinematic state to at least one of a crew of the vehicle and a vehicle system to aid in collision avoidance for the vehicle, and to aid in maintaining course of the vehicle along the travel way line.

9. The program product of claim 8, wherein elements of the state mean vector comprise at least one of: a vehicle position in two or three dimensions, a vehicle heading, a vehicle roll, a vehicle pitch, and a vehicle velocity.

10. The program product of claim 8, wherein the program instructions are configured, when executed by at least one programmable processor, to further cause the at least one programmable processor to:
detect whether a travel way line is in a successive image;
upon determining that a travel way line is in the successive image, then determine the measurement statistics; and
upon determining that a travel way line is not in the successive image, then predict for another future time epoch the state mean vector and the state covariance matrix.

11. The program product of claim 8, wherein the program instructions are configured, when executed by at least one programmable processor, to further cause the at least one programmable processor to:
update the predicted statistics by updating predicted statistics of the state mean vector and the state covariance matrix using the determined measurement statistics of the angle and the shortest distance.

12. The program product of claim 8, wherein the program instructions are configured, when executed by at least one programmable processor, to further cause the at least one programmable processor to:
generate each state mean vector and state covariance matrix sub-solution with a statistical estimator using aiding data from all measurement clusters but one measurement cluster, wherein a measurement cluster comprises a set of one or more measurements from one or more of the aiding sensors;
determine whether differences of statistics of state vectors of a full solution and of each sub-solution are each within a statistical bound, wherein the statistical bound is determined using a covariance matrix of the full solution and a covariance matrix of a respective sub-solution, and wherein a full solution is obtained by performing statistical estimation using all measurement clusters; and
upon determining that at least one difference is not within a corresponding statistical bound, then perform at least one of: (a) notifying, at least one of the vehicle crew and the vehicle system, that there is an error in at least one vehicle kinematic state and (b) providing at least one vehicle kinematic state, to at least one of the vehicle crew and the vehicle system, generated by a statistical estimator excluding aiding data from any aiding sensor whose measurements were determined to be faulty.

13. The program product of claim 8, wherein the statistical estimator comprises a Kalman filter.

14. A system configured to be mounted at least one of on a vehicle and in a vehicle, comprising:
processing circuitry;
an imager configured to capture an image and communicatively coupled to the processing circuitry;
at least one of an inertial measurement unit and an inertial navigation system communicatively coupled to the processing circuitry;
at least one aiding device communicatively coupled to the processing circuitry; and
wherein the processing circuitry is configured to:
initialize a statistical estimator with an initial state mean vector and an initial state covariance matrix;
receive inertial navigation data;

predict, for a future time epoch, a state mean vector and a state covariance matrix for a state vector of the statistical estimator using the inertial navigation data;

receive an image from the imager, the image including a ground travel way line for the vehicle, the image utilized by the processing circuitry to determine a position of the vehicle relative to the travel way line and an angular orientation of the vehicle relative to the travel way line;

determine measurement statistics for (a) an angle between a longitudinal axis of the vehicle and a longitudinal axis of the travel way line, and (b) a shortest distance between a reference point on or in the vehicle and the longitudinal axis of the travel way line;

receive measurement statistics from the at least one aiding device;

determine whether any of the measurement statistics from the at least one aiding device are erroneous;

upon determining that all of the measurement statistics from the at least one aiding device are erroneous, then output predicted statistics of the state vector, wherein the state vector comprises at least one vehicle kinematic state;

upon determining that the measurement statistics from the at least one aiding device are not erroneous, then update predicted statistics of the state vector using the determined measurement statistics of the angle and the shortest distance, wherein the state vector comprises at least one vehicle kinematic state;

cluster the imager and the at least one aiding device into physical categories of aiding sensors;

perform integrity monitoring to assure integrity of the at least one vehicle kinematic state by a process comprising:
  performing solution separation using the clusters of aiding sensors to generate state mean vector and state covariance matrix sub-solutions;
  identifying faulty aiding sensor measurements or faulty aiding sensors by statistically comparing the state mean vector and state covariance matrix sub-solutions in different combinations using the position of the vehicle relative to the travel way line and the angular orientation of the vehicle relative to the travel way line; and
  outputting vehicle kinematic state statistics that do not use the faulty aiding sensor measurements or the faulty aiding sensors; and provide the at least one vehicle kinematic state to at least one of a crew of the vehicle and a vehicle system to aid in collision avoidance for the vehicle, and to aid in maintaining course of the vehicle along the travel way line.

15. The system of claim 14, wherein:
update the predicted statistics comprises update predicted statistics of the state mean vector and the state covariance matrix using the determined measurement statistics of the angle and the shortest distance.

16. The system of claim 14, wherein elements of the state mean vector comprise at least one of: a vehicle position in two or three dimensions, a vehicle heading, a vehicle roll, a vehicle pitch, and a vehicle velocity.

17. The system of claim 14, further comprising:
autopilot circuitry communicatively coupled to the processing circuitry; and
wherein the autopilot circuitry is configured to receive at least one state mean vector from the processing circuitry and to use the received at least one state mean vector to change at least one kinematic state of the vehicle.

18. The system of claim 14, wherein the processing circuitry is further configured to:
detect whether a travel way line is in a successive image;
upon determining that a travel way line is in the successive image, then determine the measurement statistics; and
upon determining that a travel way line is not in the successive image, then predict for another future time epoch the state mean vector and the state covariance matrix.

19. The system of claim 14, wherein the processing circuitry is further configured to:
generate each state mean vector and state covariance matrix sub-solution with a statistical estimator using aiding data from all measurement clusters but one measurement cluster, wherein a measurement cluster comprises a set of one or more measurements from one or more of the aiding sensors;
determine whether differences of statistics of state vectors of a full solution and of each sub-solution are each within a statistical bound, wherein the statistical bound is determined using a covariance matrix of the full solution and a covariance matrix of a respective sub-solution, and wherein a full solution is obtained by performing statistical estimation using all measurement clusters; and
upon determining that at least one difference is not within a corresponding statistical bound, then perform at least one of: (a) notifying, at least one of the vehicle crew and the vehicle system, that there is an error in at least one vehicle kinematic state and (b) providing at least one vehicle kinematic state, to at least one of the vehicle crew and the vehicle system, generated by a statistical estimator excluding aiding data from any aiding sensor whose measurements were determined to be faulty.

20. The system of claim 14, wherein the statistical estimator comprises a Kalman filter.

* * * * *